US011310278B2

(12) United States Patent
Vasanthapuram

(10) Patent No.: US 11,310,278 B2
(45) Date of Patent: Apr. 19, 2022

(54) BREACHED WEBSITE DETECTION AND NOTIFICATION

(71) Applicant: Fortinet, Inc., Sunnyvale, CA (US)

(72) Inventor: Sameer Kumar Vasanthapuram, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 349 days.

(21) Appl. No.: 16/358,373

(22) Filed: Mar. 19, 2019

(65) Prior Publication Data

US 2020/0304544 A1  Sep. 24, 2020

(51) Int. Cl.
| | |
|---|---|
| *H04L 29/06* | (2006.01) |
| *H04L 29/12* | (2006.01) |
| *H04L 12/26* | (2006.01) |
| *G06F 16/953* | (2019.01) |
| *G06F 16/955* | (2019.01) |
| *H04L 61/4511* | (2022.01) |
| *H04L 43/08* | (2022.01) |

(52) U.S. Cl.
CPC ............ *H04L 63/20* (2013.01); *G06F 16/953* (2019.01); *G06F 16/955* (2019.01); *H04L 43/08* (2013.01); *H04L 61/1511* (2013.01); *H04L 63/083* (2013.01); *H04L 63/126* (2013.01); *H04L 63/1416* (2013.01); *H04L 63/1441* (2013.01); *H04L 63/1433* (2013.01)

(58) Field of Classification Search
CPC . H04L 63/20; H04L 63/1441; H04L 63/1416; G06F 16/953; G06F 16/955; G06F 16/958
See application file for complete search history.

(56) References Cited

U.S. PATENT DOCUMENTS

| | | | | |
|---|---|---|---|---|
| 8,370,945 | B2* | 2/2013 | Amit | H04L 63/14 726/25 |
| 10,075,847 | B1* | 9/2018 | Moreton | H04L 63/083 |
| 10,404,726 | B1* | 9/2019 | Eren | H04L 63/1416 |
| 10,812,472 | B2* | 10/2020 | Moreton | H04L 63/107 |
| 2009/0282342 | A1* | 11/2009 | Fabris | G06Q 10/02 715/733 |

* cited by examiner

*Primary Examiner* — Beemnet W Dada
(74) *Attorney, Agent, or Firm* — Law Office of Dorian Cartwright; Dorian Cartwright

(57) ABSTRACT

System and methods for a cloud-based approach to breached website detection and notification as a security service are provided. According to one embodiment, a network security device protecting a private network of an enterprise, intercepts information associated with an interaction with a website by a browser of a client device associated with the private network. The network security device, based on the information, proactively determines whether the website or a domain with which the website is associated has been reported as having been breached by querying a cloud-based security service that actively maintains a list of breached websites. In response to the determining being affirmative, the network security device notifies the user regarding an occurrence of a security breach involving the domain or the website by issuing a replacement Hypertext Transfer Protocol (HTTP) response message to the browser.

11 Claims, 8 Drawing Sheets

BREACHED WEBSITE DETECTION AND NOTIFICATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

The present invention generally relates to the field of cybersecurity and, in particular, to a cloud-based approach to detection and notification regarding breached websites as a security service.

Description of the Related Art

A security breach is an incident that results in unauthorized access of data, applications, services, networks and/or devices as a result of bypassing their underlying security mechanisms. Over the past years, there has been an increase in breaches resulting in exposure of several million personal records, such as usernames, email addresses, passwords and credit card information, hosted on large public websites and hacking forums.

Password policies employed by enterprises typically only enforce complexity and frequency requirements in connection with requiring changes to user passwords. Notably, however, this is not enough to ascertain whether an employee has reused one or more social media and/or other public account passwords on the enterprise network. When a website's password data is exposed as a result of a breach, typically the website resets users' passwords and prompts users to change their passwords the next time they login; however, this doesn't force users to change passwords on other accounts, including enterprise accounts (e.g., email accounts, remote access accounts and the like), which may expose those other user accounts to hackers who will try to exploit the passwords obtained via the breach to gain access to other websites and networks on which the users may have accounts by way of so-called credential stuffing attacks, for example, in which bots automatically test millions of email and password combinations on a whole range of website login pages.

In view of the foregoing, there exists a need in the art to develop a technique that proactively identifies security breaches and notifies affected users to change associated passwords for the domain at issue as well as enterprise accounts.

SUMMARY

Systems and methods are described for a cloud-based approach to breached website detection and notification as a security service. According to one embodiment, a network security device protecting a private network of an enterprise, intercepts information associated with an interaction with a website by a browser of a client device associated with the private network. The network security device, based on the information, proactively determines whether the website or a domain with which the website is associated has been reported as having been breached by querying a cloud-based security service that actively maintains a list of breached websites. In response to the determining being affirmative, the network security device notifies the user regarding an occurrence of a security breach involving the domain or the website by issuing a replacement Hypertext Transfer Protocol (HTTP) response message to the browser.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
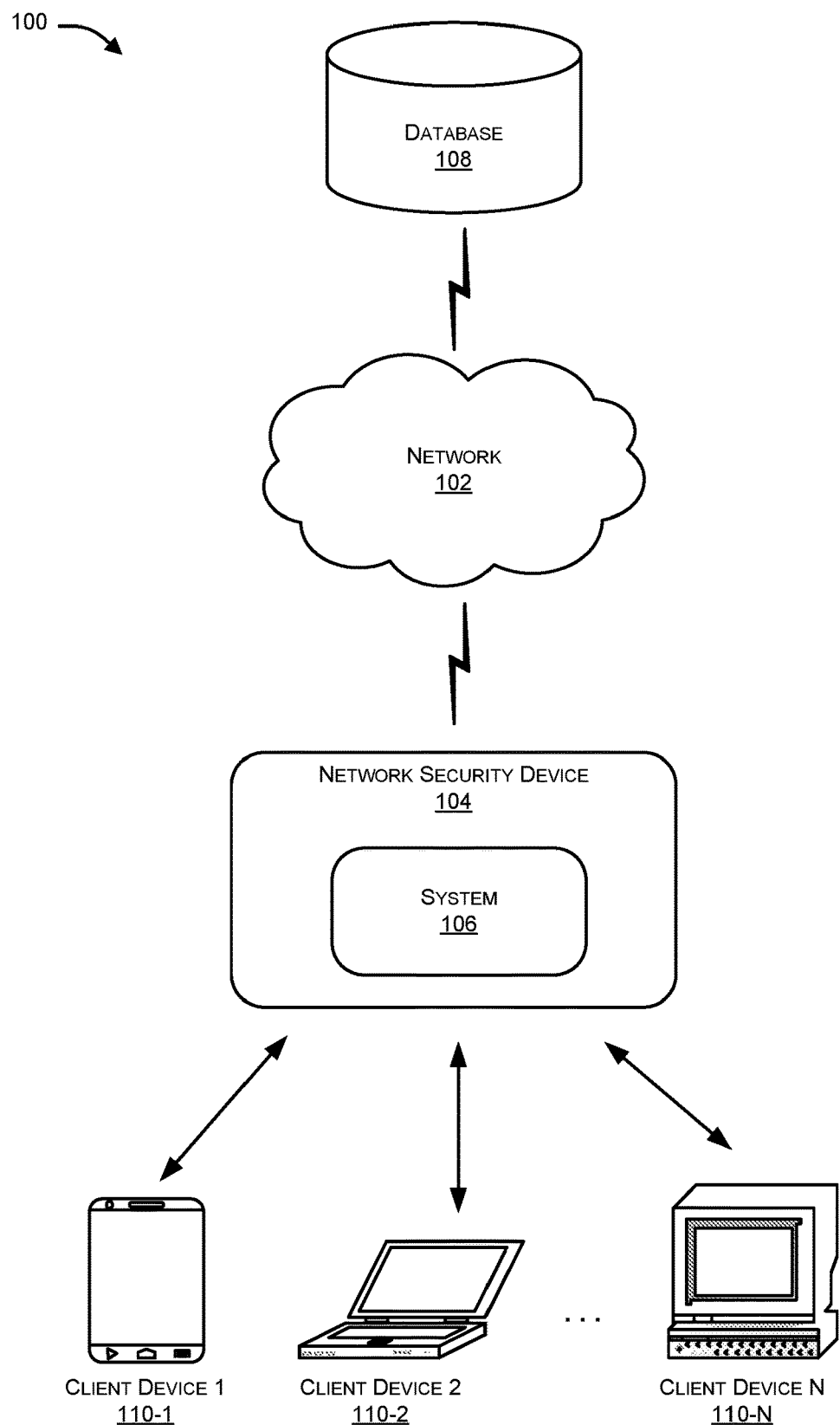
FIG. 1 illustrates an exemplary network architecture in which or with which embodiments of the present invention can be implemented.

System and methods are described for a cloud-based approach to breached website detection and notification as a security service. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below. Although the present disclosure has been described with the purpose of conducting network auditing, it should be appreciated that the same has been done merely to illustrate the invention in an exemplary manner and any other purpose or function for which the explained structure or configuration can be used, is covered within the scope of the present disclosure.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "endpoint device" generally refers to a network-capable computer hardware device, typically on a Transmission Control Protocol (TCP)/Internet Protocol (IP) network. Non-limiting examples of endpoint devices include servers, desktop computers, laptops, smart phones, tablets, thin clients, Internet of Things (IoT) devices, printers or other specialized hardware (e.g., Point of Sale (POS) terminals and smart meters).

The phrases "endpoint protection system" or "endpoint security solution" generally refers a system that (i) focuses on protecting endpoint devices in a network from cyber threats and attacks by malicious internal and external threats, (ii) provides endpoint management functionality, for example, allowing a network administrator to identify and manage the users' computers access over a corporate or enterprise network and/or (iii) protects the enterprise network by blocking access attempts and/or other risky activity at these points of entry to the enterprise network. An endpoint protection system may proactively defend endpoints with one or more of pattern-based anti-malware technology, behavior-based exploit protection, web-filtering, and an application firewall. For example, a network administrator may configure the endpoint protection system to restrict certain website access to specific users in order to maintain and comply with an organization's policies and standards. Similarly, an endpoint protection system may provide antivirus/antimalware, sandbox protection and/or vulnerability management scanning and may additionally be configurable to remediate identified issues and/or automatically quarantine a suspicious or compromised endpoint in order to contain incidents and stem outbreaks. Non-limiting examples of endpoint protection systems include the FortiClient endpoint security solution (available from the assignee of the present invention), Cybereason, Sentinel. One endpoint security software, Stormshield SES, ForeScout CounterAct, Promisec PEM, CounterTack Sentinel, CrowdStrike Falcon Host, Guidance Software Encase, and Comodo Advanced Endpoint Protection.

The phrase "network security device" generally refers to a hardware device or network appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), Internet Protocol (IP) security (IPSec), Secure Sockets Layer (SSL), antivirus, intrusion detection, intrusion prevention, Web content filtering, spyware prevention and anti-spam. Examples of network appliances include, but are not limited to, network gateways and network security devices (e.g., FORTIGATE family of network security devices and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

If the specification states a component or feature "may", "can", "could", or "might" be included or have a characteristic, that particular component or feature is not required to be included or have the characteristic.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention are described and illustrated herein, it will be clear to those skilled in the art that the invention is not limited to such embodiments. Numerous modifications, changes, variations, substitutions, and equivalents will be apparent to those skilled in the art, without departing from the spirit and scope of the invention, as described in the claims.

Embodiments of the present disclosure pertain to a cloud-based approach to breached website detection and notification as a security service. Various techniques disclosed herein enable detection of a security breach associated with a website requested by a user of a private network. A proactive alert can be provided to the user when there is a possibility of user information having been exposed as a result of a known/documented breach of the website at issue. Further, the user can be redirected to a password change portal associated with the particular domain of the requested website. In addition, in order to minimize the possibility of enterprise accounts being hacked, when the user is logging into a breached website, the user can be redirected by a network security device associated with the enterprise network to a password portal of the enterprise that enables the user to reset enterprise account passwords.

An aspect of the present disclosure pertains to a method that can include intercepting, by a network security device protecting a private network of an enterprise, information associated with an interaction with a website by a browser of a client device associated with the private network; based on the information, proactively determining, by the network security device, whether the website or a domain with which the website is associated has been reported as having been breached by querying a cloud-based security service that actively maintains a list of breached websites; and when the determining is affirmative, then notifying, by the network security device, the user regarding an occurrence of a security breach involving the domain or the website by issuing a replacement HTTP response message to the browser.

In an embodiment, the list of breached websites contains information regarding domains and websites for which confidential information of users has been exposed.

In an embodiment, the intercepting is as a result of Domain Name System (DNS) based filtering or web filtering performed by the network security device.

In an embodiment, the method can further include prior to the querying, parsing, by the network security device, the information to extract one or more of a Uniform Resource Locator (URL) associated with the website or a Common Name contained within a Secure Socket Layer (SSL) certificate of the website.

In an embodiment, the method can further include causing, by the network security device, the user to reset passwords of their enterprise accounts by causing the browser to be redirected to a password portal associated with the enterprise.

In an embodiment, the method can further include monitoring, by an endpoint security solution running on the client device, inputs by the user on login portals of public websites; precluding the user from reusing passwords across public and intranet domains by comparing, by the endpoint security solution, the inputs to one or more user passwords for enterprise accounts of the user; when the comparing results in detection of a match between a password for a particular public website and a password of a particular enterprise service, then: causing, by the network security device, the user to reset the password for the particular public website by causing the browser to be redirected to a password change portal associated with the public website; and causing, by the network security device, the user to reset the password for the particular enterprise service by causing the browser to be redirected to a password portal associated with the particular enterprise service.

FIG. 1 illustrates a simplified network architecture 100 in which or with which embodiments of the present invention can be implemented. In the context of the present example, a system 106 can be implemented by/within a network security device 104 for detection of whether a website that a user of the private network may be attempting to access is among those reported to have been the subject of a breach. Network architecture 100 illustrates multiple client devices 110-1, 110-2, ..., 110-N (which may be collectively referred to as client devices 110 and which may be individually referred to as client device 110, hereinafter) that can be communicatively coupled through the private network protected by network security device 104.

Network security device 104 can be utilized for interfacing between an internal or the private network and an external network (e.g., network 102), such that client devices 110 of the private network can interact with network resources residing outside of the private network. The private network can pertain to an enterprise such as an organization, a company, an entity, a workplace and the like and may only be accessible to users associated with the enterprise through client devices 110. Also, the enterprise may provide enterprise services or enterprise domains that users of the private network are permitted to access using enterprise accounts. In one embodiment, the users can be employees, staff, workforce or any other person that is associated with the enterprise. Non-limiting examples of client devices 110 include personal computers, smart devices, web-enabled devices, hand-held devices, laptops, tablet computers, mobile phones and the like that can be used by the users to connect to the private network.

As will be appreciated by those skilled in the art, the various networks described herein can include one or more wireless networks, wired networks or a combination thereof that can be implemented as part of different types of networks, such as an Intranet, a Local Area Network (LAN), a Wide Area Network (WAN), the Internet, and the like. Further, the networks can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Further, the network security device 106 can provide an interface between the private network and the external network by effectively managing and regulating network traffic by utilizing a set of protocols. Non-limiting examples of network security device 106 include a firewall, an anti-virus scanning device, a content filtering device, an intrusion detection device, a Unified Threat Management (UTM) device, a web caching device, etc. In an exemplary embodiment of the present disclosure, system 106 can also be implemented using any or a combination of hardware and software elements. Hardware elements can include network devices installed within a private network to enable connection of client devices 110 such as a router, a bridge, a server, an access point, a gateway, a hub and the like or to provide. Software elements can include a web browser, an email client, a mail server, a web server or other software that processes web traffic. Although in the context of various embodiments described herein, system 106 is described as being implemented in network security device 104, those skilled in the art will appreciate that system 106 may be deployed in various other locations. For example, system 106 can be implemented as a standalone application on client devices 100 or within an endpoint protection system installed on client devices 110.

In an embodiment, database 108 may represent a data store of cloud-based security service that maintains a list of breached websites in real-time. As illustrated, database 108 may interact with network security device 104 or system 106 through network 102 in order to enable network security device 104 to query the cloud-based security service via a web services interface or a RESTful API, for example, provided by the cloud-based security service to determine whether a user accessing a resource external to the private network via client device 100 is interacting with a website known by the cloud-based security service to have been the subject of a breach.

In an aspect, system 106 can intercept information associated with an interaction with the website by client device 110 through an interface provided by a browser running on client device 110. Further, system 106 can parse the information to extract a URL or domain name associated with the website or a common name contained within a SSL certificate of the website. In one embodiment, system 106 can perform DNS based filtering or web filtering to intercept DNS requests or a common name of the SSL certificate to submit such information for a determination by the cloud-based security service regarding whether there has been a reported security breach associated with the requested website or a domain associated therewith. Alternatively or additionally, system 106 may extract such information from observed HTTP requests.

In an aspect, system 106 can proactively determine whether the website or the domain with which the website is associated has been reported as having been breached by querying a cloud-based security service (e.g., one of the FortiGuard security subscription services available from the assignee of the present invention) implementing database 108 (e.g., a URL or domain name database) that actively maintains a list of breached websites. The list of breached websites may be generated through research and intelligence gathered from various sources, for example, from third parties (e.g., security researchers, reports/databases available from cybersecurity firms, public disclosure/self-reporting by an entity associated with the breached website, press reports, and other online resources (e.g., Have I Been Pwned)). According to an implementation, a subscription based model may be utilized for access to the cloud based security service.

In an aspect, in response to the determination that the website or the domain with which the website is associated has been breached, system 106 can notify the user regarding an occurrence of a security breach involving the domain or the website by issuing a replacement HTTP response message to the browser of the client device 110. For example, if a website "www.asd.com" requested by a user X has been determined to be associated with a security breach by system 106, system 106 may provide a warning to user X indicating that the requested website has been breached so that user X may decide whether to proceed to access "www.asd.com" or not.

In an embodiment, the replacement HTTP response message may provide a link to a password reset portal for the breached website. Additionally or alternatively, the replacement HTTP response may provide a link to reset passwords of the user's enterprise accounts associated with enterprise services. Further, in order to provide a secure environment for the user of the private network, system 106 implemented in network security device 104, may interact with an endpoint security solution running on client device 110. The integration of system 104 with the endpoint security solution may ensure that the user does not reuse passwords across public and intranet/private or enterprise domains. The endpoint security solution running on client device 110 can monitor inputs by the user on login portals of public websites such that the user can be precluded from reusing passwords across public and intranet or enterprise domains.

Those skilled in the art will appreciate that, various embodiments of system 106 may be utilized to alert the user when there is a possibility of their passwords or account information being exploited, by detection of security breaches associated with requested websites. Further, the user can be redirected to password change portal of particular domain of the requested website. Furthermore, in order to minimize the possibility of enterprise accounts being hacked due to reuse of passwords, if the user is logging into a breached website, the user can be redirected to a portal that enables the user to reset enterprise account passwords. Also, using an endpoint security solution running on client device 110, user inputs on public website can be monitored and compared with enterprise account passwords to proactively prohibit the user from using the same passwords across public and enterprise accounts.

Figure 2:
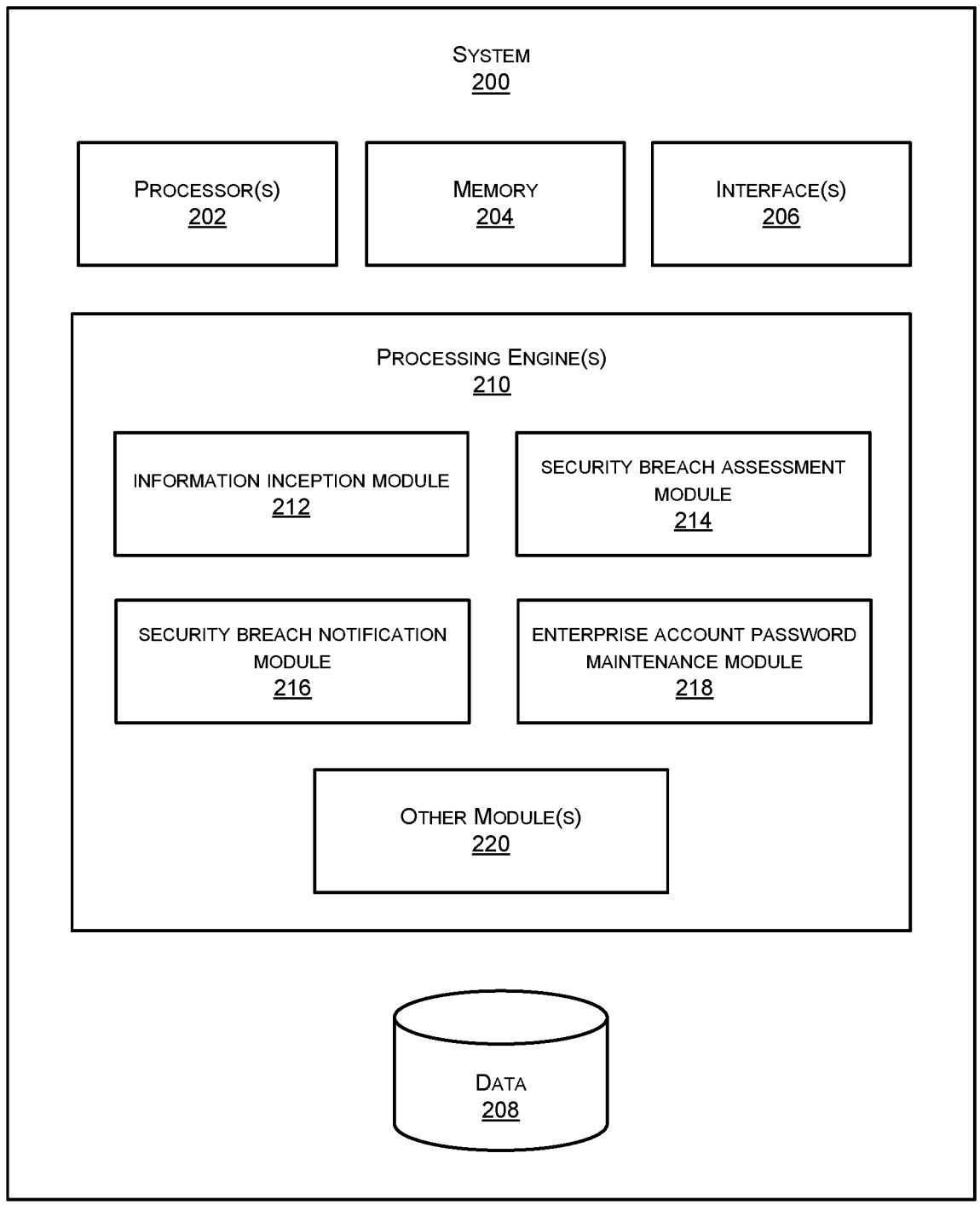
FIG. 2 illustrates an exemplary module diagram for alerting a user in event of a security breach in accordance with an embodiment of the present invention.

FIG. 2 illustrates an exemplary module diagram for alerting a user in event of a security breach in accordance with an embodiment of the present invention. As illustrated, system 200, which may represent a network security device (e.g., network security device 104), can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of system 200. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and a Cloud.

System 200 can also include one or more interface(s) 206. Interface(s) 206 may include a variety of interfaces, for example, interfaces for data input and output devices, referred to as I/O devices, storage devices, and the like. Interface(s) 206 may facilitate communication of system 200 with various devices coupled to system 200. Interface(s) 206 may also provide a communication pathway for one or more components of system 200. Examples of such components include, but are not limited to, processing engine(s) 210 and data 208.

Engine(s) 210 can be implemented as a combination of hardware and software or firmware programming (for example, programmable instructions) to implement one or more functionalities of engine(s) 210. In the examples described herein, such combinations of hardware and software or firmware programming may be implemented in several different ways. For example, the programming for the engine(s) may be processor executable instructions stored on a non-transitory machine-readable storage medium and the hardware for engine(s) 210 may include a processing resource (for example, one or more processors), to execute such instructions. In the examples, the machine-readable storage medium may store instructions that, when executed by the processing resource, implement engine(s) 210. In such examples, system 200 can include the machine-readable storage medium storing the instructions and the processing resource to execute the instructions, or the machine-readable storage medium may be separate but accessible to system 200 and the processing resource. In other examples, engine(s) 210 may be implemented by electronic circuitry. Data 208 can include data that is either stored or generated as a result of functionalities implemented by any of the components of the engine(s) 210.

In an example, processing engine(s) 210 can include an information inception module 212, a security breach assessment module 214, a security breach notification module 216, an enterprise account password maintenance module 218 and other module(s) 220. Other module(s) 220 can implement functionalities that supplement applications or functions performed by system 200 or processing engine(s) 210.

In an aspect, information interception module 212 can intercept information associated with an interaction with a website by a web browser running on a client device (e.g., client device 110 associated with a private network of an enterprise). The information associated with the interaction with the website can be obtained via an interface provided by the web browser. For example, when the end user attempts to access a website, the user may select a hyper-link associated the website or may manually enter all or a portion (if an autocomplete feature is available) of a web address associated with the website into an address bar or other graphical control element of the browser. Thus, information interception module 212 can intercept information, such as a web address associated with a selected hyper-link or a web address submitted via a browser's address bar.

In an embodiment, interception module 212 can parse the information to extract a Uniform Resource Locator (URL) associated with the website. The URL specifies an address on the World Wide Web (WWW) and represents a fundamental network identification for any document or resource, such as a hypertext page, a video, an image, a sound file and the like on the web. The URL may contain a protocol identifier indicating what protocol to use and a resource name specifying the Internet Protocol (IP) address or domain name where the resource is located.

In an embodiment, interception module 212 can also extract a common name contained within an SSL certificate of the website by parsing the information. Those skilled in the art will appreciate that an SSL certificate of a website aids in protecting privacy, critical security, and ensures data integrity for the website by encrypting sensitive data so that data remains unreadable while it potentially traverses through multiple public networks. The SSL certificate of the website includes the common name that identifies a host domain name associated with the certificate. An example of a common name of a website may be in the form "www.abc.com" or "abc.com".

In one embodiment, information interception module 212 can perform DNS based filtering or web filtering to intercept the information associated with the interaction with the website. The DNS based filtering or web filtering can be performed using either certificate based inspection or full SSL inspection for Hypertext Transfer Protocol Secure (HTTPS) traffic. Therefore, when the user makes a request for a website through a client device while connected to the private network, the request can be parsed by a network security device protecting the private network to facilitate the security breach determination discussed herein. In an alternate embodiment, information interception module 212 can intercept a DNS request or common name of the SSL certificate or the actual HTTP request from the information for performing a security breach determination.

In an aspect, security breach assessment module 214, based on the information, can proactively determine whether the website or a domain with which the website is associated has been reported as having been breached by querying a cloud-based security service that actively maintains a list of breached websites. In an embodiment, the cloud-based security service can pertain to database 108 of FIG. 1 that maintains a list of breached websites in real-time. The list of breached websites can contain information regarding domains and websites for which confidential information of users has been exposed. According to one embodiment, a subscription based model may be utilized to provide access to the cloud based security service. According to an example, if a user has requested to visit "www.xyz.com", security breach assessment module 214 may query database 108 to determine whether "www.xyz.com" has been associated with a security breach.

In an aspect, in response to the determination that the website or the domain with which the website is associated has been reported as having been breached, security breach notification module 216 can notify the user regarding an occurrence of a security breach involving the domain or the website by issuing a replacement HTTP response message, for example, to the browser. Therefore, when on querying the cloud-based security service it has been determined that there has been a security breach associated with the website that has been requested by the user, security breach notification module 216 can notify the user about the security breach. According to an example, if a website "www.xyz.com" requested by the user has been determined to be associated with a security breach by security breach assessment module 214, security breach notification module 216 may provide a warning to the user indicating the requested website has been breached. The user may then decide whether to proceed to access "www.xyz.com" or not.

Additionally, in an embodiment, the replacement HTTP response message may also include a variable field that can provide a link to a password reset portal for the website that was requested. According to an example, if a website "www.xyz.com" requested by the user has been determined to be associated with a security breach by security breach assessment module 214, security breach notification module 216 may provide a warning to the user indicating the requested website has been breached and additionally may also redirect the browser to password reset portal of the requested website or allow the user to follow a provided link to the password reset portal. The user may then decide whether to proceed to access "www.xyz.com" or proceed to change password associated with an account on the website "www.xyz.com".

In an embodiment, in the event that an occurrence of a security breach has been determined by security breach assessment module 214, enterprise account password maintenance module 218 can cause the user to reset passwords of their enterprise accounts by causing the browser to be redirected to a password portal associated with the enterprise. For example, in the event of a security breach associated with the requested website, along with a notification displayed by security breach notification module 216, enterprise account password maintenance module 218 may redirect the user of the private network to change their passwords for their accounts within the enterprise. In an implementation, once the warning is displayed, a new browser window may redirect the user to a portal specified by the enterprise and configured on the DNS filtering or web Filtering profile of the private network.

Further, in order to provide a secure environment for the user of the private network, system 106 implemented in network security device 104, may interact with an endpoint security solution running on client device 110. The integration of system 104 with the endpoint security solution may affirm that the user does not reuse passwords across public and intranet/private or enterprise domains.

In one embodiment, the endpoint security solution running on client device 110 can monitor and store inputs (in hashed form, for example) by the user on login portals of public websites such that the user can be precluded from reusing passwords across public and intranet domains. The endpoint security solution can preclude the user from reusing the password by comparing the inputs to one or more user passwords for enterprise accounts of the user. In an example, user inputs can be monitored by the endpoint security solution on login portals of public websites such that hash of user passwords for public and enterprise accounts can be compared.

In an event when the comparing of the passwords by the endpoint security solution results in detection of a match between a password for a particular public website and a password of a particular enterprise service or an enterprise account, then enterprise account password maintenance module 218 can cause the user to reset the password for the particular public website or the password for the enterprise account by causing the browser to be redirected to a password change portal associated with the public website or the enterprise account, respectively. For example, if a user has used a password "QWERTY!@" for an account on public website "www.abc.com" (whether breached or not) and subsequently attempts to use the same password "QWERTY! @" for an account on an enterprise service, enterprise account password maintenance module 218 may require the user to change the password for the account on the public website "www.abc.com" or may preclude the user from using the same password for the enterprise service account. Further, those skilled in the art will appreciate that when any security breach on a public website has been detected, the user can be redirected to the password change portal of that particular website, and at the same time the endpoint security solution on client device 110 can monitor the user inputs provided on the password change portal of the particular website in order to preclude the user from using the presumably exposed password for any enterprise service accounts.

In an embodiment, enterprise account password maintenance module 218 may further cause the user to reset a password for the particular enterprise service by causing the browser to be redirected to a password portal associated with the particular enterprise service. Those skilled in the art will appreciate that the user can be redirected to the enterprise password change portal and endpoint security solution can monitor the user input on the enterprise password portal as well. Should the password provided by the user on the enterprise password portal match a password provided on a public website (whether breached or not), a warning can be displayed that requires the user to use a different password for the enterprise password portal. An exemplary process for enabling the user to change passwords in the event of determining the existence of a security breach associated with a requested website is described further below with reference to FIG. 5.

An exemplary implementation of various modules of system 200 is explained with the help of an example. In an example, a user may have provided information to interact with "mail.abc.com" to a browser of a client device. Information interception module 212 may use DNS or web filtering to analyze the DNS request and/or Common Name on the SSL certificate to establish that the user intends to visit "mail.abc.com". Further, security breach assessment module 214 may then determine whether "mail.abc.com" or its domain "abc.com" has been reported to be associated with a security breach by querying database 108 of the cloud-based security service that actively maintains the list of breached websites and/or domains associated with breached websites. In an event when, there is record that "mail.abc.com" has been breached, security breach notification module 216 can notify the user that the requested website has been the subject of a security breach and can issue a replacement HTTP response message to the user. The replacement HTTP response message may be a warning that alerts the user that the requested website has been breached and can provide an option indicating "hit ok to continue". Further, the user can be redirected to change the password of an account associated with the breached website and/or one or more accounts associated with enterprise services. Further, when the user is redirected to the change password portal of the enterprise, the integration of enterprise account password maintenance module 218 and endpoint security solution may prevent the user from using the same password for the account on the breached website "mail.abc.com" and the enterprise account.

Figure 3A:
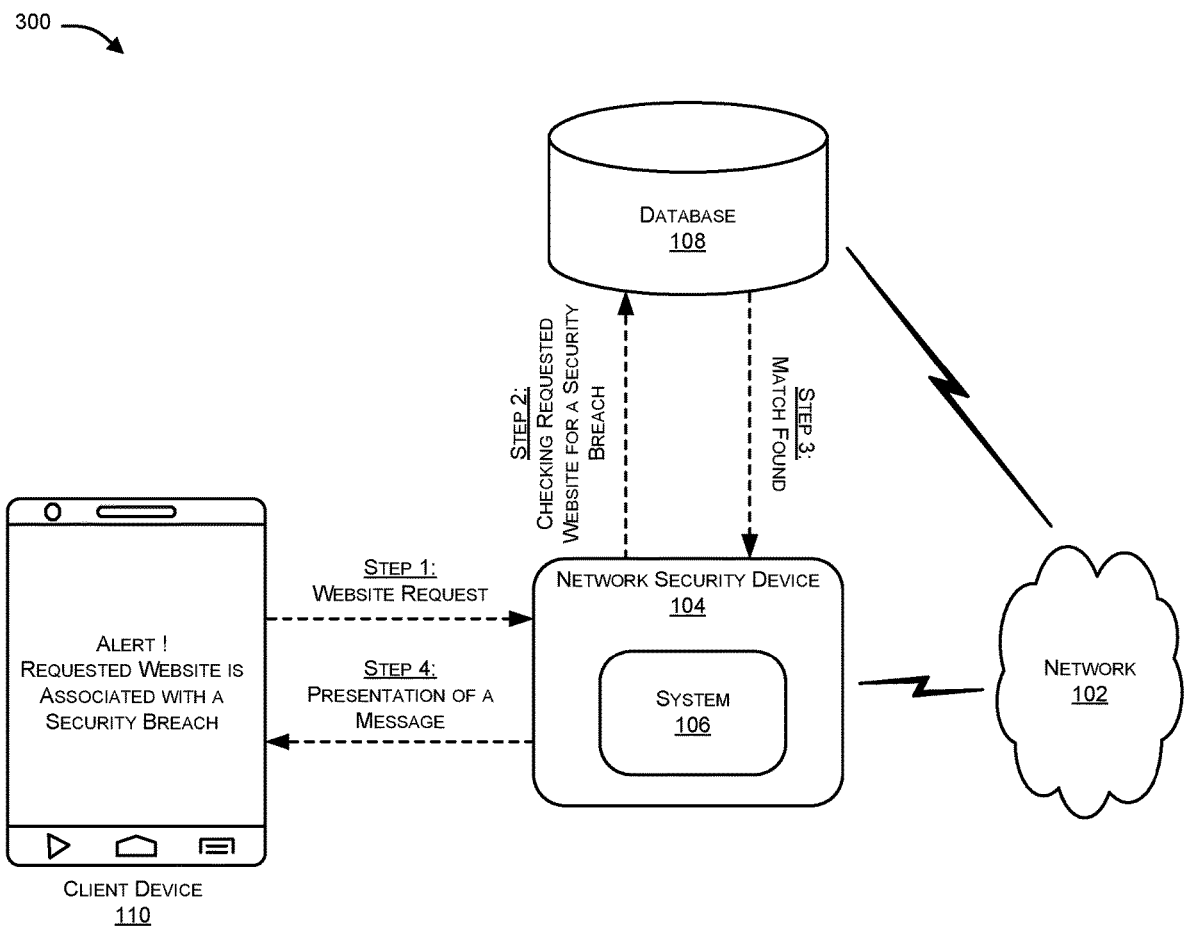
FIGS. 3A-C exemplary interactions with a breach detection system in accordance with an embodiment of the present invention.
Figure 3B:
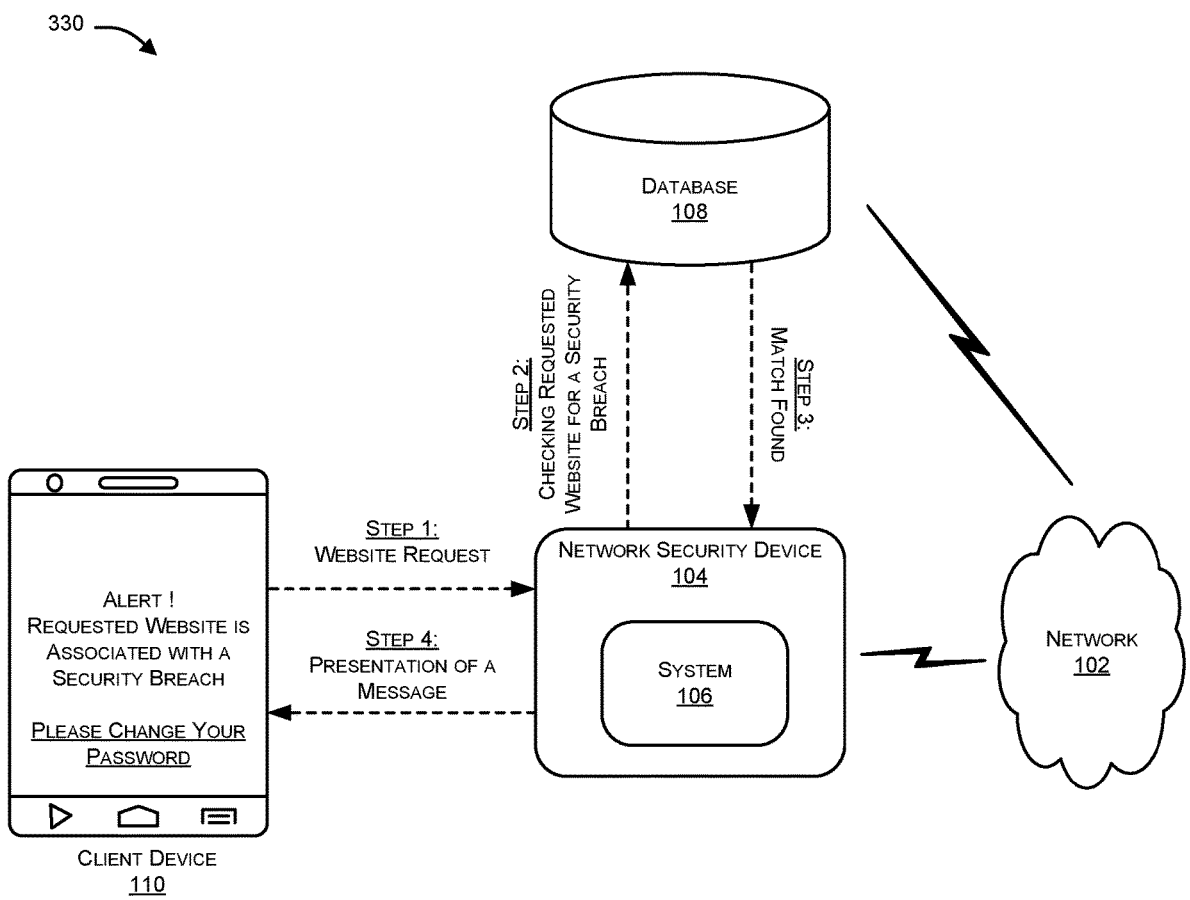
Figure 3C:
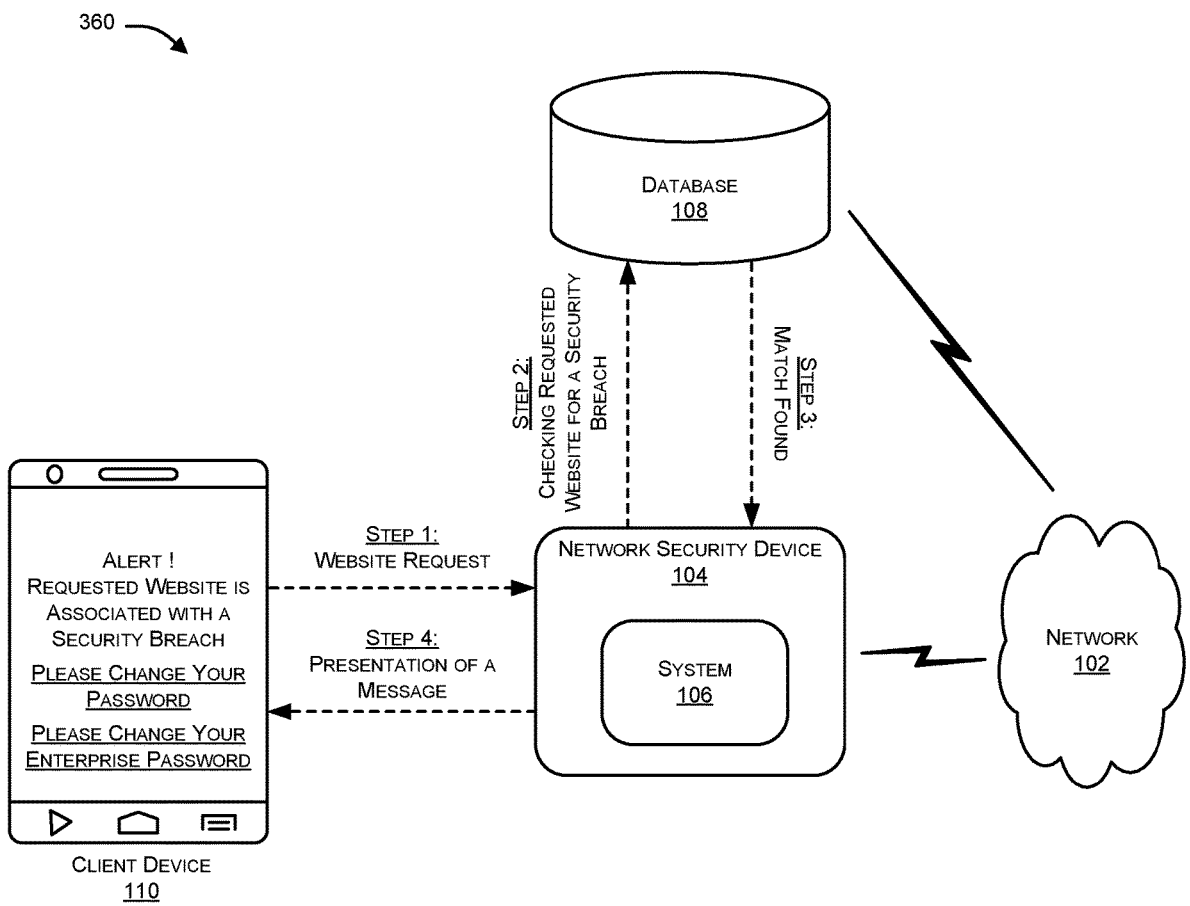

FIGS. 3A-C illustrate exemplary interactions with a breach detection system in accordance with an embodiment of the present invention. At step 1, system 106 implemented in network security device 104 observes an attempt by a client device 110 to interact with a website, for example, in the form of an HTTP request via a browser of client device. Responsive to the website request, at step 2, system 106 may proactively determine whether the website at issue or an associated domain has been the subject of a breach by querying a cloud-based security service including database 108 that maintains a list of breached websites. At step 3, assuming the website at issue is in the list of breached websites, database 108 responds to the query received from system 106 indicating the requested website has been breached. At step 4, system 106 can cause a message to be presented to a user of the client device 110 via the browser.

In the context of the present example, the message is a warning indicating that the requested website is associated with a security breach. In this manner, the user can make an informed decision regarding whether to continue with the requested access to the website.

In the example as illustrated in FIG. 3B, along with the warning, the user can be provided with a prompt or link to change the password of an account on the requested website and/or an enterprise account password. In an implementation, as noted above, the input provided by the user on the password change portal can be monitored by an endpoint security solution running on client device 110. For example, while changing the password for the account on the public website, the input provided by the user can be compared with the password of the user for one or more enterprise services to make sure the user does not reuse an enterprise account password on a public website. During the monitoring process, if it is determined that the user has attempted to reuse an enterprise account password for an account on a public website (e.g., by comparing hashed values of the user's enterprise account passwords to a hashed value of a password attempted to be used on the public website), submission of the password to the public website may be blocked by the endpoint security solution and the user may be required to choose another password, thereby precluding the user from reusing passwords across public and intranet domains.

In the example as illustrated in FIG. 3C, along with the warning, the user can be provided with a prompt or link to change both the password of the account on the requested website and an enterprise account password. Again, the input provided by the user on either of the password change portals can be monitored by an endpoint security solution running on client device 110. For example, while changing the password for an enterprise service, the input provided by the user can be compared with previously captured passwords of the user for accounts on public websites or specifically the breached website that was requested by the user to make sure the user does not reuse a password used on a public website, especially one that has been breached. During the monitoring process, if it is determined that the user's password for a particular public website and a password of a particular enterprise service match, the user may be required to choose another password, thereby precluding the user from reusing passwords across public and intranet domains.

Figure 4:
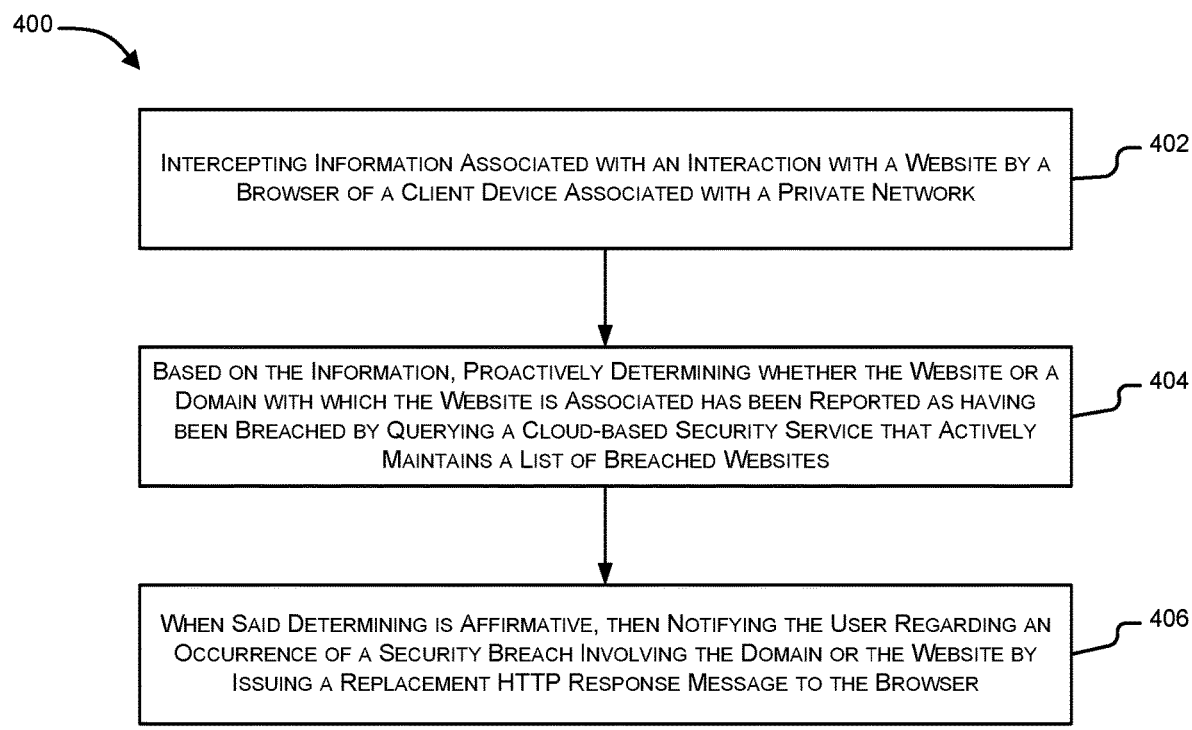
FIG. 4 illustrates a flow diagram for alerting a user in the event of a security breach in accordance with an embodiment of the present invention.

FIG. 4 is a flow diagram 400 illustrating alert processing in accordance with an embodiment of the present invention. In the context of the present example, at block 402, network security device (e.g., network security device 104), protecting a private network of an enterprise, intercepts information associated with an interaction with a website by a browser of a client device (e.g., client device 110) associated with the private network. For example, network security device can perform DNS based filtering or web filtering to intercept one or more of DNS requests, common names of SSL certificates and actual HTTP requests from network traffic traversing the network security device for analysis to determine whether such requests might relate to a website associated with a security breach. In an embodiment, responsive to intercepting the information at issue, a URL associated with the website or a common name contained within an SSL certificate of the website can be extracted by parsing the information.

At block 404, network security device can proactively determine whether the website or a domain with which the website is associated has been reported as having been breached by querying a cloud-based security service that actively maintains a list of breached websites. Thus, the website may be determined to be associated with a security breach if a match is found in the list of breached websites maintained by the cloud-based security service.

At block 406, when the determining is affirmative (that is, when the cloud-based security service indicates a match has been found for the website requested by the network security device), network security device may notify the user regarding an occurrence of the security breach involving the domain or the website, for example, by issuing a replacement HTTP response message to the browser. Thus, the response message may alert the user when he/she is trying to access a website that has been associated with a security breach.

Further, in an embodiment, when the user is trying to access a breached website, network security device may facilitate the user making a change to the password for an account the user has on the breached website and/or an account for one or more enterprise services by redirecting the browser to respective password portals associated with the breached website and/or the enterprise. Additionally, an endpoint security solution running on the client device may monitor inputs by the user on login portals of public websites to prevent the user from reusing passwords across public and intranet or enterprise domains, which can be achieved by comparing the inputs to one or more user passwords for enterprise accounts of the user.

Figure 5:
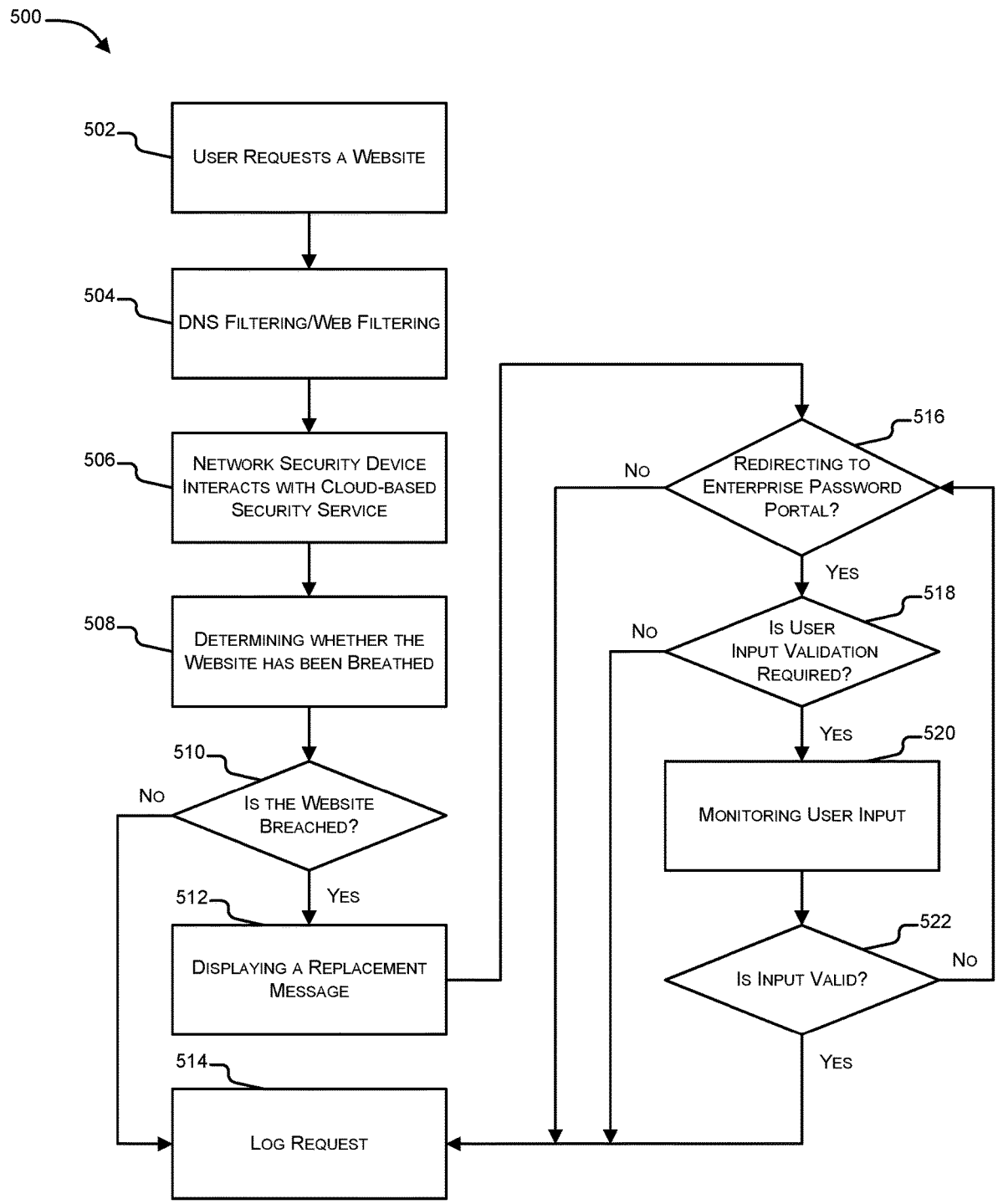
FIG. 5 is a flow diagram illustrating a process for enabling a user to change a password responsive to detecting the user is interacting with a website that has been the subject of a security breach in accordance with an embodiment of the present invention.

FIG. 5 is a flow diagram 500 illustrating a process for enabling a user to change a password responsive to detecting the user is interacting with a website that has been the subject of a security breach in accordance with an embodiment of the present invention. In context of the present example, at block 502, a user may request a website by, for example, selecting a hyperlink of a web page displayed within a web browser of a client device or entering a URL of the website into an address bar of the browser. The client device can be a part of a private network of an enterprise that is protected by network security device to enable detection regarding whether the requested website is associated with a security breach.

At block 504, network security device can intercept information associated with the requested website. Those skilled in the art will appreciate there are various mechanisms to intercept such information. Non-limiting examples of intercepting such information include intercepting the HTTP request or performing DNS filtering or web filtering to obtain the DNS request or a common name of the SSL certificate. Further, at block 506, network security device can query a cloud-based security service that maintains a database of breached websites. At block 508, network security device can determine whether the website has been breached based on the response provided by the cloud-based security service.

At decision block 510, if the website is determined to have been the subject of a security breach, processing continues with block 512. If the website is determined not to have been the subject of a security breach, processing branches to block 514. At block 512, a replacement message (e.g., a substitute or modified version of a response provided by the website at issue) can be displayed to the user via the browser. In an example, this replacement message is an HTTP response message that includes a warning to the user that the requested website is associated with a security breach and that the user can click "OK" to continue. Additionally or alternatively, the response message can encourage, facilitate or require the user to change a password of one or more enterprise accounts by redirecting the browser to the enterprise password change portal, at block 516. At block 514, when the requested website is not one that has been the subject of a security breach, the request can simply be logged for future reference. For example, should the website be the subject of a future security breach, the user may be proactively notified by the network security device.

In context of the present example, when the browser has been redirected to the enterprise password change portal at block 516, the portal may require validation of input provided by the user at block 518. If the validation is not required, a log of the password change can be maintained at block 514. If the validation is required, at block 520, an endpoint security solution running on client device 110 of the user can monitor the input provided by the user. At decision block 522, the determination regarding whether the input is valid can be performed by matching the user's input with any password previously used by the user for an account on a public website. If a match is found, the input may be considered invalid and the user can be redirected to the enterprise password portal again at block 516 to require the user to use a different password. At block 524, if the user input is found to be valid, the log can be updated at block 514.

Figure 6:
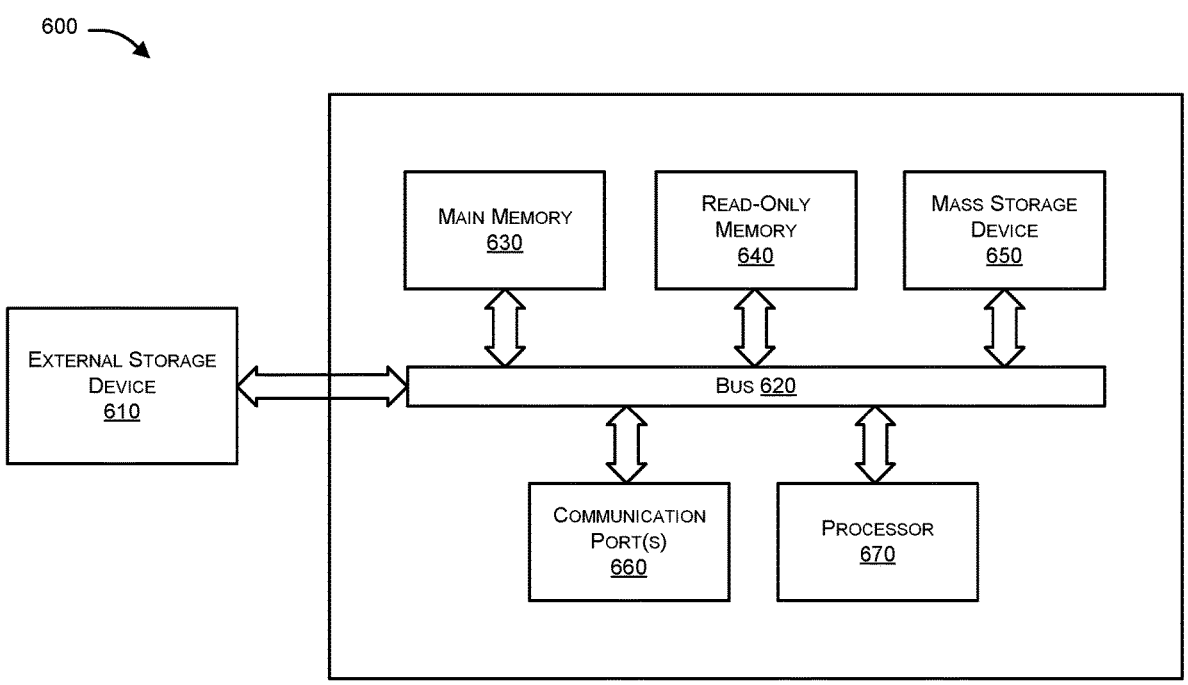
FIG. 6 illustrates an exemplary computer system in which or with which embodiments of the present invention may be utilized in accordance with embodiments of the present invention.

FIG. 6 illustrates an exemplary computer system in which or with which embodiments of the present invention may be utilized in accordance with embodiments of the present invention. Computer system 600 may represent a network security device (e.g., network security device 104) or a client device (e.g., client device 110).

As shown in FIG. 6, computer system includes an external storage device 610, a bus 620, a main memory 630, a read only memory 640, a mass storage device 650, communication port 660, and a processor 670. Computer system may represent some portion of a network security device (e.g., network security device 104) or system 106.

Those skilled in the art will appreciate that computer system 600 may include more than one processor 670 and communication ports 660. Examples of processor 1070 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    intercepting, by a network security device protecting a private network of an enterprise, information associated with an interaction with a website by a browser of a client device associated with the private network;
    based on the information, proactively determining, by the network security device, whether the website or a domain with which the website is associated has been a subject of a security breach by querying a cloud-based security service that actively maintains a list of breached websites; and
    when said determining is affirmative, then causing, by the network security device, the user to be notified regarding the security breach involving the domain or the website by issuing a replacement Hypertext Transfer Protocol (HTTP) response message to the browser;
    monitoring, by an endpoint security solution running on the client device, inputs by the user on login portals of public websites;
    precluding the user from reusing passwords across public and intranet domains by comparing, by the endpoint security solution, the inputs to one or more user passwords for enterprise accounts of the user;
    when said comparing results in detection of a match between a password for a particular public website and a password of a particular enterprise service, then:
        causing, by the network security device, the user to reset the password for the particular public website by causing the browser to be redirected to a password change portal associated with the public website; and
        causing, by the network security device, the user to reset the password for the particular enterprise service by causing the browser to be redirected to a password portal associated with the particular enterprise service.

2. The method of claim 1, wherein the list of breached websites contains information regarding domains and websites for which confidential information of users has been exposed.

3. The method of claim 1, wherein said intercepting is as a result of Domain Name System (DNS) based filtering or web filtering performed by the network security device.

4. The method of claim 1, further comprising prior to said querying, parsing, by the network security device, the information to extract one or more of a Uniform Resource Locator (URL) associated with the website or a Common Name contained within a Secure Socket Layer (SSL) certificate of the website.

5. The method of claim 1, further comprising causing, by the network security device, the user to reset passwords of their enterprise accounts by causing the browser to be redirected to a password portal associated with the enterprise.

6. A network security system comprising:
    a non-transitory storage device having embodied therein one or more routines operable to alert a user of a client device associated with a private network of an enterprise of security breaches relating to websites the user visits; and one or more processors coupled to the non-transitory storage device and operable to execute the one or more routines to perform a method comprising:

intercepting, by a network security device protecting the private network, information associated with an interaction with a website by a browser of the client device;

based on the information, proactively determining, by the network security device, whether the website or a domain with which the website is associated has been a subject of a security breach by querying a cloud-based security service that actively maintains a list of breached websites; and when said determining is affirmative, then causing, by the network security device, the user to be notified regarding the security breach involving the domain or the website by issuing a replacement Hypertext Transfer Protocol (HTTP) response message to the browser;

monitoring, by an endpoint security solution running on the client device, inputs by the user on login portals of public websites;

precluding the user from reusing passwords across public and intranet domains by comparing, by the endpoint security solution, the inputs to one or more user passwords for enterprise accounts of the user;

when said comparing results in detection of a match between a password for a particular public website and a password of a particular enterprise service, then:

causing, by the network security device, the user to reset the password for the particular public website by causing the browser to be redirected to a password change portal associated with the public website; and causing, by the network security device, the user to reset the password for the particular enterprise service by causing the browser to be redirected to a password portal associated with the particular enterprise service.

7. The network security system of claim 6, wherein the list of breached websites contains information regarding domains and websites for which confidential information of users has been exposed.

8. The network security system of claim 6, wherein said intercepting is as a result of Domain Name System (DNS) based filtering or web filtering performed by the network security device.

9. The network security system of claim 6, wherein the method further comprises prior to said querying, parsing, by the network security device, the information to extract one or more of a Uniform Resource Locator (URL) associated with the website or a Common Name contained within a Secure Socket Layer (SSL) certificate of the website.

10. The network security system of claim 6, wherein the method further comprises causing, by the network security device, the user to reset passwords of their enterprise accounts by causing the browser to be redirected to a password portal associated with the enterprise.

11. A non-transitory media strong computer-readable source code that, when executed by a processor, performs a method comprising:

intercepting, by a network security device protecting a private network of an enterprise, information associated with an interaction with a website by a browser of a client device associated with the private network;

based on the information, proactively determining, by the network security device, whether the website or a domain with which the website is associated has been a subject of a security breach by querying a cloud-based security service that actively maintains a list of breached websites; and when said determining is affirmative, then causing, by the network security device, the user to be notified regarding the security breach involving the domain or the website by issuing a replacement Hypertext Transfer Protocol (HTTP) response message to the browser;

monitoring, by an endpoint security solution running on the client device, inputs by the user on login portals of public websites;

precluding the user from reusing passwords across public and intranet domains by comparing, by the endpoint security solution, the inputs to one or more user passwords for enterprise accounts of the user;

when said comparing results in detection of a match between a password for a particular public website and a password of a particular enterprise service, then:

causing, by the network security device, the user to reset the password for the particular public website by causing the browser to be redirected to a password change portal associated with the public website; and causing, by the network security device, the user to reset the password for the particular enterprise service by causing the browser to be redirected to a password portal associated with the particular enterprise service.

* * * * *